United States Patent
Kamata

(10) Patent No.: US 9,564,760 B2
(45) Date of Patent: Feb. 7, 2017

(54) CONTACTLESS POWER FEEDING SYSTEM

(71) Applicant: SEMICONDUCTOR ENERGY LABORATORY CO., LTD., Atsugi-shi, Kanagawa-ken (JP)

(72) Inventor: Koichiro Kamata, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

(21) Appl. No.: 15/000,109

(22) Filed: Jan. 19, 2016

(65) Prior Publication Data

US 2016/0134133 A1    May 12, 2016

Related U.S. Application Data

(63) Continuation of application No. 13/705,317, filed on Dec. 5, 2012, now Pat. No. 9,246,357.

(30) Foreign Application Priority Data

Dec. 7, 2011 (JP) .................... 2011-267725

(51) Int. Cl.
*H02J 5/00* (2016.01)
*H02J 17/00* (2006.01)
*H02J 7/02* (2016.01)

(52) U.S. Cl.
CPC ............... *H02J 5/005* (2013.01); *H02J 7/025* (2013.01); *H02J 17/00* (2013.01)

(58) Field of Classification Search
CPC .................. H02J 5/005; H02J 7/025
(Continued)

(56) References Cited

U.S. PATENT DOCUMENTS

| 3,879,647 A | 4/1975 | Hamilton et al. |
| 5,124,699 A | 6/1992 | Tervoert et al. |

(Continued)

FOREIGN PATENT DOCUMENTS

| EP | 2017940 A | 1/2009 |
| EP | 2161808 A | 3/2010 |

(Continued)

OTHER PUBLICATIONS

Kurs.A et al., "Wireless Power Transfer via Strongly Coupled Magnetic Resonances", Science, Jul. 6, 2007, vol. 317, No. 5834, pp. 83-86.
Karalis.A et al., "Efficient wireless non-radiative mid-range energy transfer", Annals of Physics, 2008, vol. 323, pp. 34-48.
Miyamoto.T et al., "Wireless Power Transfer System with a Simple Receiver Coil", IMWS 2011 (2011 IEEE MTT-S International Microwave Workshop Series), May 12, 2011, pp. 131-134.
(Continued)

*Primary Examiner* — Dharti Patel
(74) *Attorney, Agent, or Firm* — Nixon Peabody LLP; Jeffrey L. Costellia

(57) ABSTRACT

A contactless power feeding system includes a power transmitting device and a power receiving device. The power transmitting device includes a first AC power source configured to generate an AC power with a first frequency, a second AC power source configured to generate an AC power with a second frequency which is different from the first frequency, a first electromagnetic induction coil, and a first resonant coil. The power receiving device includes a second resonant coil, a second electromagnetic induction coil, and a power storage unit. Power is wirelessly supplied to the power storage unit at the second frequency by a magnetic resonance phenomenon which occurs between the first resonant coil and the second resonant coil.

11 Claims, 7 Drawing Sheets

(58) Field of Classification Search
USPC .......................................................... 307/104
See application file for complete search history.

(56) References Cited

U.S. PATENT DOCUMENTS

| | | | |
|---|---|---|---|
| 5,126,585 A | 6/1992 | Boys | |
| 5,428,521 A | 6/1995 | Kigawa et al. | |
| 5,790,946 A | 8/1998 | Rotzoll | |
| 5,998,968 A | 12/1999 | Pittman et al. | |
| 6,025,695 A | 2/2000 | Friel et al. | |
| 6,184,660 B1 | 2/2001 | Hatular | |
| 6,509,217 B1 | 1/2003 | Reddy | |
| 6,636,146 B1 | 10/2003 | Wehoski | |
| 6,737,302 B2 | 5/2004 | Arao | |
| 6,837,438 B1 | 1/2005 | Takasugi et al. | |
| 7,180,421 B2 | 2/2007 | Pahlaven et al. | |
| 7,209,771 B2 | 4/2007 | Twitchell | |
| 7,301,830 B2 | 11/2007 | Takahashi et al. | |
| 7,394,382 B2 | 7/2008 | Nitzan et al. | |
| 7,808,206 B2 | 10/2010 | Nagatsuka et al. | |
| 7,898,215 B2 | 3/2011 | Nagatsuka et al. | |
| 8,054,037 B2 | 11/2011 | Nagatsuka et al. | |
| 8,090,550 B2 | 1/2012 | Azancot et al. | |
| 8,188,854 B2 | 5/2012 | Yamashita | |
| 8,212,520 B2* | 7/2012 | Takada | B60L 11/182 180/65.27 |
| 8,339,097 B2* | 12/2012 | Kojima | H02J 7/025 320/106 |
| 8,344,688 B2 | 1/2013 | Yoda et al. | |
| 8,441,364 B2 | 5/2013 | Azancot et al. | |
| 8,626,461 B2 | 1/2014 | Azancot et al. | |
| 8,629,577 B2 | 1/2014 | Azancot et al. | |
| 8,674,655 B2 | 3/2014 | Nagatsuka et al. | |
| 8,749,097 B2 | 6/2014 | Azancot et al. | |
| 8,836,273 B2 | 9/2014 | Yoda et al. | |
| 8,965,720 B2 | 2/2015 | Azancot et al. | |
| 9,300,145 B2 | 3/2016 | Hirasaka et al. | |
| 9,362,049 B2 | 6/2016 | Azancot et al. | |
| 2002/0049714 A1 | 4/2002 | Yamazaki et al. | |
| 2003/0017804 A1 | 1/2003 | Heinrich et al. | |
| 2003/0104848 A1 | 6/2003 | Brideglall | |
| 2004/0077383 A1 | 4/2004 | Lappetelainen et al. | |
| 2004/0128246 A1 | 7/2004 | Takayama et al. | |
| 2004/0131897 A1 | 7/2004 | Jenson et al. | |
| 2004/0145454 A1 | 7/2004 | Powell et al. | |
| 2005/0020321 A1 | 1/2005 | Rotzoll | |
| 2005/0215119 A1 | 9/2005 | Kaneko | |
| 2005/0254183 A1 | 11/2005 | Ishida et al. | |
| 2006/1000925 | 1/2006 | Noda.S et al. | |
| 2007/0188135 A1 | 8/2007 | Odaohhara | |
| 2007/0216348 A1 | 9/2007 | Shionoiri et al. | |
| 2007/0229228 A1 | 10/2007 | Yamazaki et al. | |
| 2007/0229271 A1 | 10/2007 | Shionoiri et al. | |
| 2007/0229279 A1 | 10/2007 | Yamazaki et al. | |
| 2007/0229281 A1 | 10/2007 | Shionoiri et al. | |
| 2007/0285246 A1 | 12/2007 | Koyama | |
| 2007/1027899 | 12/2007 | Koyama | |
| 2008/0200119 A1 | 8/2008 | Onishi et al. | |
| 2009/0021219 A1* | 1/2009 | Yoda | H02J 7/0011 320/137 |
| 2009/0195165 A1 | 8/2009 | Yang | |
| 2010/0244577 A1 | 9/2010 | Shimokawa | |
| 2010/0244580 A1 | 9/2010 | Uchida et al. | |
| 2010/0259109 A1 | 10/2010 | Sato | |
| 2010/0289449 A1 | 11/2010 | Elo | |
| 2011/0018358 A1 | 1/2011 | Kozakai | |
| 2011/0080053 A1 | 4/2011 | Urano | |
| 2011/0095619 A1 | 4/2011 | Urano | |
| 2011/0101791 A1 | 5/2011 | Urano | |
| 2011/0115430 A1 | 5/2011 | Saunamaki | |
| 2011/0187321 A1 | 8/2011 | Hirayama | |
| 2011/0227421 A1 | 9/2011 | Sakoda et al. | |
| 2011/0270462 A1 | 11/2011 | Amano et al. | |
| 2012/0032521 A1 | 2/2012 | Inoue et al. | |
| 2012/0038619 A1 | 2/2012 | Shraga et al. | |
| 2012/0133212 A1 | 5/2012 | Kamata | |
| 2012/0187771 A1* | 7/2012 | Kamata | H02J 7/025 307/104 |
| 2013/0049481 A1 | 2/2013 | Kudo et al. | |
| 2013/0069585 A1 | 3/2013 | Kamata | |
| 2013/0082648 A1 | 4/2013 | Kamata | |
| 2013/0154385 A1* | 6/2013 | Miwa | H02J 17/00 307/104 |
| 2013/0162203 A1* | 6/2013 | Kamata | H02J 7/025 320/108 |
| 2014/0008997 A1 | 1/2014 | Azancot et al. | |
| 2014/0175897 A1* | 6/2014 | Taguchi | H01M 10/46 307/104 |
| 2014/0191719 A1 | 7/2014 | Nagatsuka et al. | |
| 2014/0312709 A1 | 10/2014 | Nakano et al. | |
| 2014/0368165 A1 | 12/2014 | Yoda et al. | |
| 2015/0108847 A1* | 4/2015 | Taylor | H02J 50/12 307/104 |
| 2015/0214752 A1 | 7/2015 | Gluzman et al. | |

FOREIGN PATENT DOCUMENTS

| | | |
|---|---|---|
| EP | 2154763 A | 5/2010 |
| EP | 2325037 A | 5/2011 |
| EP | 2372870 A | 10/2011 |
| EP | 2421121 A | 2/2012 |
| EP | 2562678 A | 2/2013 |
| JP | 04-256226 A | 9/1992 |
| JP | 2001-502833 | 2/2001 |
| JP | 2002-101578 A | 4/2002 |
| JP | 2006-180073 A | 7/2006 |
| JP | 2008-136341 A | 6/2008 |
| JP | 2008-236917 A | 10/2008 |
| JP | 2010-016985 A | 1/2010 |
| JP | 2010-119246 A | 5/2010 |
| JP | 2010-130878 A | 6/2010 |
| JP | 2010-154255 A | 7/2010 |
| JP | 2010-522534 | 7/2010 |
| JP | 2010-178473 A | 8/2010 |
| JP | 2010-193598 A | 9/2010 |
| JP | 2010-239690 A | 10/2010 |
| JP | 2010-239769 A | 10/2010 |
| JP | 2010-252446 A | 11/2010 |
| JP | 2010-252468 A | 11/2010 |
| JP | 2010-284058 A | 12/2010 |
| JP | 2011-029799 A | 2/2011 |
| JP | 2011-062008 A | 3/2011 |
| JP | 2011-155836 A | 8/2011 |
| JP | 2011-166883 A | 8/2011 |
| JP | 2012-060730 A | 3/2012 |
| JP | 2012-060731 A | 3/2012 |
| JP | 2013-046561 A | 3/2013 |
| JP | 2013-102594 A | 5/2013 |
| WO | WO-2008/093334 | 8/2008 |
| WO | WO-2008/114268 | 9/2008 |
| WO | WO-2010/030005 | 3/2010 |
| WO | WO-2010/055381 | 5/2010 |
| WO | WO-2010/064584 | 6/2010 |
| WO | WO-2010/103525 | 9/2010 |
| WO | WO-2010/119577 | 10/2010 |
| WO | WO-2012/070634 | 5/2012 |
| WO | WO-2013/069472 | 5/2013 |
| WO | WO-2015/155774 | 10/2015 |

OTHER PUBLICATIONS

International Search Report (Application No. PCT/JP2011/077109) Dated Feb. 21, 2012.
Written Opinion (Application No. PCT/JP2011/077109) Dated Feb. 21, 2012.

* cited by examiner

CONTACTLESS POWER FEEDING SYSTEM

BACKGROUND OF THE INVENTION

1. Field of the Invention

One embodiment of the invention disclosed herein relates to contactless power transmitting devices, contactless power receiving devices, and contactless power feeding systems.

2. Description of the Related Art

Various electronic appliances have spread, and a variety of products is shipped to the market. In recent years, portable electronic devices such as cellular phones and digital video cameras have widely spread. Further, electric propulsion machines that are powered by electric power, such as electric cars, appear on the market as products.

In such cellular phones, digital video cameras or electric propulsion machines, power storage units (referred to as batteries and storage batteries) are incorporated. Currently, such a power storage unit is charged in most cases by being directly connected to a household AC power source which is a power feeding means. In a structure which has no power storage unit or which does not use power stored in a power storage unit, a device is operated by power supplied directly from a household AC power source via a wire or the like.

On the other hand, methods by which power storage units are charged without making contact or power is supplied to loads without making contact have been researched and developed. Typical methods are an electromagnetic coupling method (also referred to as electromagnetic induction method, see Reference 1), a radio wave method (also referred to as microwave method), and a magnetic resonance method (also referred to as resonant method, see References 2 to 4).

As described in References 2 to 4, in a contactless power feeding technique using a magnetic resonance method, a device that receives power (hereinafter, referred to as power receiving device) and a device that feeds power (hereinafter, referred to as power transmitting device) each have a resonant coil. Further, in each of the power receiving device and the power transmitting device, an electromagnetic induction coil is provided. Feeding of power from a power source to the resonant coil in the power transmitting device and feeding of power from the resonant coil to a load in the power receiving device are conducted by the electromagnetic induction coils.

In the resonant coil of the power transmitting device and the resonant coil of the power receiving device, resonance frequencies (LC resonance) are adjusted so that a magnetic resonance phenomenon occurs at a particular frequency.

When the resonant coil of the power transmitting device and the resonant coil of the power receiving device face each other, they makes a magnetic resonance phenomenon, and thereby efficient power transfer is realized even when the distance between the resonant coils is large (see Reference 6).

In recent years, identification technologies in which ID (identification number) is assigned to an individual object to clarify the history of information thereof, which is utilized for production, management, or the like have attracted attention. In particular, RFID (radio frequency identification) technology for transmitting and receiving data by wireless communication has been widely used (see Reference 5). A wireless communication system using the RFID technology is a communication system including a wireless communication device (interrogator) and a data carrier (transponder) and communicating data wirelessly therebetween. The wireless communication device refers to a device capable of wirelessly transmitting and receiving signals, such as a reader/writer, a cellular phone, or a personal computer. In this specification, the wireless communication device is typically referred to as a reader/writer. In addition, the data carrier is generally called an RFID, an RF tag, an ID tag, an IC tag, an IC chip, a wireless tag, an electronic tag, or the like. In this specification, the data carrier is typically referred to as an RFID.

Examples of RFIDs include passive RFIDs which do not have power sources and active RFIDs which incorporate power sources. The passive RFID has a function of converting a wireless signal (carrier wave or amplitude-modulated wave generated by superimposing modulation wave on carrier wave) transmitted from a reader/writer into a DC voltage by a rectifier circuit which is provided in the RFID, and circuits in the RFID operate using the DC voltage.

REFERENCES

[Reference 1] Japanese Published Patent Application No. 2002-101578

[Reference 2] Japanese Published Patent Application No. 2010-193598

[Reference 3] Japanese Published Patent Application No. 2010-239690

[Reference 4] Japanese Published Patent Application No. 2010-252468

[Reference 5] Japanese Published Patent Application No. 2006-180073

[Reference 6] "Wireless power feeding 2010, all about contactless charging and wireless power transfer" *Nikkei Electronics*, Mar. 2010, pp. 66-81.

SUMMARY OF THE INVENTION

As described above, the wireless communication system using the RFID technology in which data is transmitted or received by wireless communication is a communication system where data is communicated between a wireless communication device (interrogator) and a data carrier (transponder). In the wireless communication system using the RFID technology, wireless communication is performed at a first frequency of 13.56 MHz, for example. Accordingly, efficient wireless communication can be performed.

Moreover, if an antenna (coil) for wireless communication can be used for contactless power feeding, an additional antenna for contactless power feeding is not required; thus, the size and cost of a contactless power feeding system can be reduced.

The wireless power feeding technique (contactless power feeding technique) is a technique of transmitting an AC power generated by an AC power source from a power transmitting device to a power receiving device.

Here, general AC power sources are illustrated in FIG. 2A and FIG. 2B. The AC power source illustrated in FIG. 2A is a half-bridge type switching power source. The AC power source illustrated in FIG. 2B is a full-bridge type switching power source.

The AC power source illustrated in FIG. 2A includes a DC power source 301, a capacitor 302, a capacitor 303, a transistor 304, a transistor 305, and a coil 306. As the transistor 304 and the transistor 305, an n-channel MOS transistor is used, for example.

The AC power source illustrated in FIG. 2B includes a DC power source 311, a transistor 312, a transistor 313, a transistor 314, a transistor 315, and a coil 316. As the transistor 312, the transistor 313, the transistor 314 and the transistor 315, an n-channel MOS transistor is used, for example.

In the AC power source in FIG. 2A, an alternating current is supplied to the coil 306 using the transistor 304 and the transistor 305 as switching elements based on signals input to gates of the transistor 304 and the transistor 305 from the external. In this manner, an AC power is generated.

In the AC power source in FIG. 2B, the alternating current is supplied to the coil 316 using the transistor 312, the transistor 313, the transistor 314, and the transistor 315 as switching elements based on signals input to gates of the transistor 312 and the transistor 315 and signals input to gates of the transistor 313 and the transistor 314 from the external. In this manner, an AC power is generated.

In FIG. 2A and FIG. 2B, the drive frequency of the transistor is the operation frequency of the AC power source. Thus, the drive frequency of the AC power source is a second frequency (e.g., 100 kHz) which is different from the frequency for wireless communication system using the RFID technology (e.g. 13.56 MHz). In other words, high power transmission efficiency can not be achieved with the first frequency for wireless communication system using the RFID technology.

If the wireless communication device (interrogator) and the data carrier (transponder) for wireless communication which drive at the first frequency, and the power transmitting device and the power receiving device for contactless power feeding which drive at the second frequency are provided in one contactless power feeding system, the contactless power feeding system becomes larger and manufacturing cost is increased.

In view of the above, one object of one embodiment of the invention disclosed herein is to obtain a downsized contactless power transmitting device. Moreover, one object of one embodiment of the invention disclosed herein is to obtain a downsized contactless power receiving device. Furthermore, one object of one embodiment of the invention disclosed herein is to obtain a downsized contactless power feeding system which includes the contactless power transmitting device and the contactless power receiving device and which is capable of performing both wireless communication and contactless power feeding.

In addition, one object of one embodiment of the invention disclosed herein is to obtain a contactless power feeding system which is capable of both wireless communication and contactless power feeding and which can be manufactured at low cost.

One embodiment of the present invention aims to achieve at least one of the above-described objects.

One embodiment of the invention disclosed herein relates to a contactless power transmitting device including a first AC power source configured to generate an AC power with a first frequency, a second AC power source configured to generate an AC power with a second frequency which is different from the first frequency, an electromagnetic induction coil, a resonant coil, a switch electrically connected to the electromagnetic induction coil and configured to control switching a connection to the electromagnetic induction coil between the first AC power source and the second AC power source, and a control circuit electrically connected to the first AC power source, and the second AC power source and configured to control the switch.

One embodiment of the invention disclosed herein relates to a contactless power receiving device including a resonant coil, an electromagnetic induction coil, a load modulation circuit electrically connected to the electromagnetic induction coil and configured to generate a modulation signal, a rectifier circuit configured to convert an AC power transmitted to the electromagnetic induction coil into a DC power, a smoothing circuit configured to smooth the DC power converted by the rectifier circuit, a voltage conversion circuit configured to convert a voltage value of the smoothed DC power into another voltage value, a switch between the smoothing circuit and the voltage conversion circuit, a charge control circuit to which a power output by the voltage conversion circuit is input, a power storage unit whose charging is controlled by the charge control circuit, and a control circuit electrically connected to the load modulation circuit and configured to control the switch.

One embodiment of the invention disclosed herein relates to a contactless power feeding system including a power transmitting device and a power receiving device. The power transmitting device includes a first AC power source configured to generate an AC power with a first frequency, a second AC power source configured to generate an AC power with a second frequency which is different from the first frequency, a first electromagnetic induction coil, and a first resonant coil. The power receiving device includes a second resonant coil, a second electromagnetic induction coil, and a power storage unit. Wireless communication is performed at the first frequency by an electromagnetically induced resonance between the first electromagnetic induction coil and the second electromagnetic induction coil. Power is wirelessly supplied to the power storage unit at the second frequency by a magnetic resonance phenomenon which occurs between the first resonant coil and the second resonant coil.

One embodiment of the invention disclosed herein relates to a contactless power feeding system including a power transmitting device and a power receiving device. The power transmitting device includes a first AC power source configured to generate an AC power with a first frequency, a second AC power source configured to generate an AC power with a second frequency which is different from the first frequency, a first electromagnetic induction coil configured to transmit the AC power by electromagnetic coupling, a first resonant coil configured to transmit the AC power transmitted from the first electromagnetic induction coil by a magnetic resonance phenomenon, a first switch electrically connected to the first electromagnetic induction coil and configured to control switching a connection to the first electromagnetic induction coil between the first AC power source and the second AC power source, and a first control circuit electrically connected to the first AC power source and the second AC power source and configured to control the first switch. The power receiving device includes a second resonant coil to which the AC power is transmitted from the first resonant coil by a magnetic resonance phenomenon which occurs at the second frequency, a second electromagnetic induction coil to which the AC power is transmitted from the second resonant coil by electromagnetic coupling and configured to resonate with the first electromagnetic induction coil at the first frequency, a load modulation circuit electrically connected to the second electromagnetic induction coil and configured to generate a modulation signal based on a response signal, a rectifier circuit configured to convert the AC power transmitted to the second electromagnetic induction coil into a DC power, a smoothing circuit configured to smooth the DC power converted by the rectifier circuit, a voltage conversion circuit configured to convert a voltage value of the smoothed DC power into another voltage value, a second switch between the smoothing circuit and the voltage conversion circuit, a charge control circuit to which a power output by the voltage conversion circuit is input, a power storage unit whose charging is controlled by the charge control circuit, and a second control circuit electrically connected to the load modulation circuit and configured to generate the response signal and to control the second switch.

When wireless communication is performed, the first switch makes the first AC power source electrically connect to the first electromagnetic induction coil based on a signal from the first control circuit. In addition, the second switch is turned off based on a signal from the second control circuit. Accordingly, the electromagnetically induced resonance occurs between the first electromagnetic induction coil and the second electromagnetic induction coil at the first frequency. In this manner, wireless communication is performed between the power transmitting device and the power receiving device.

When wireless power feeding (contactless power feeding) is performed, the first switch makes the second AC power source electrically connect to the first electromagnetic induction coil based on a signal from the first control circuit. In addition, the second switch is turned on based on a signal from the second control circuit. Accordingly, an AC power from the second AC power source is transmitted from the first electromagnetic induction coil to the first resonant coil by electromagnetic coupling. At the second frequency, the AC power is transmitted from the first resonant coil to the second resonant coil by a magnetic resonance phenomenon. Moreover, the AC power is transmitted from the second resonant coil to the second electromagnetic induction coil by electromagnetic coupling. The transmitted AC power is rectified by the rectifier circuit, smoothed by the smoothing circuit, and input to the voltage conversion circuit as a DC power. The DC power whose voltage value is converted into another voltage value by the voltage conversion circuit is stored in the power storage unit via the charge control circuit.

In one embodiment of the invention disclosed herein, the second AC power source includes a DC power source and a plurality of transistors, and the second frequency is a drive frequency of the plurality of transistors.

In one embodiment of the invention disclosed herein, the first resonant coil and the second resonant coil are each open at opposite ends and each have floating capacitance.

In one embodiment of the invention disclosed herein, a capacitor is electrically connected to opposite ends of the first resonant coil and a capacitor is electrically connected to opposite ends of the second resonant coil.

According to one embodiment of the invention disclosed herein, a downsized contactless power feeding system which is capable of performing both wireless communication and contactless power feeding can be obtained.

Moreover, according to one embodiment of the invention disclosed herein, a contactless power feeding system which is capable of both wireless communication and contactless power feeding and which can be manufactured at low cost can be obtained.

DETAILED DESCRIPTION OF THE INVENTION

Figure 1:
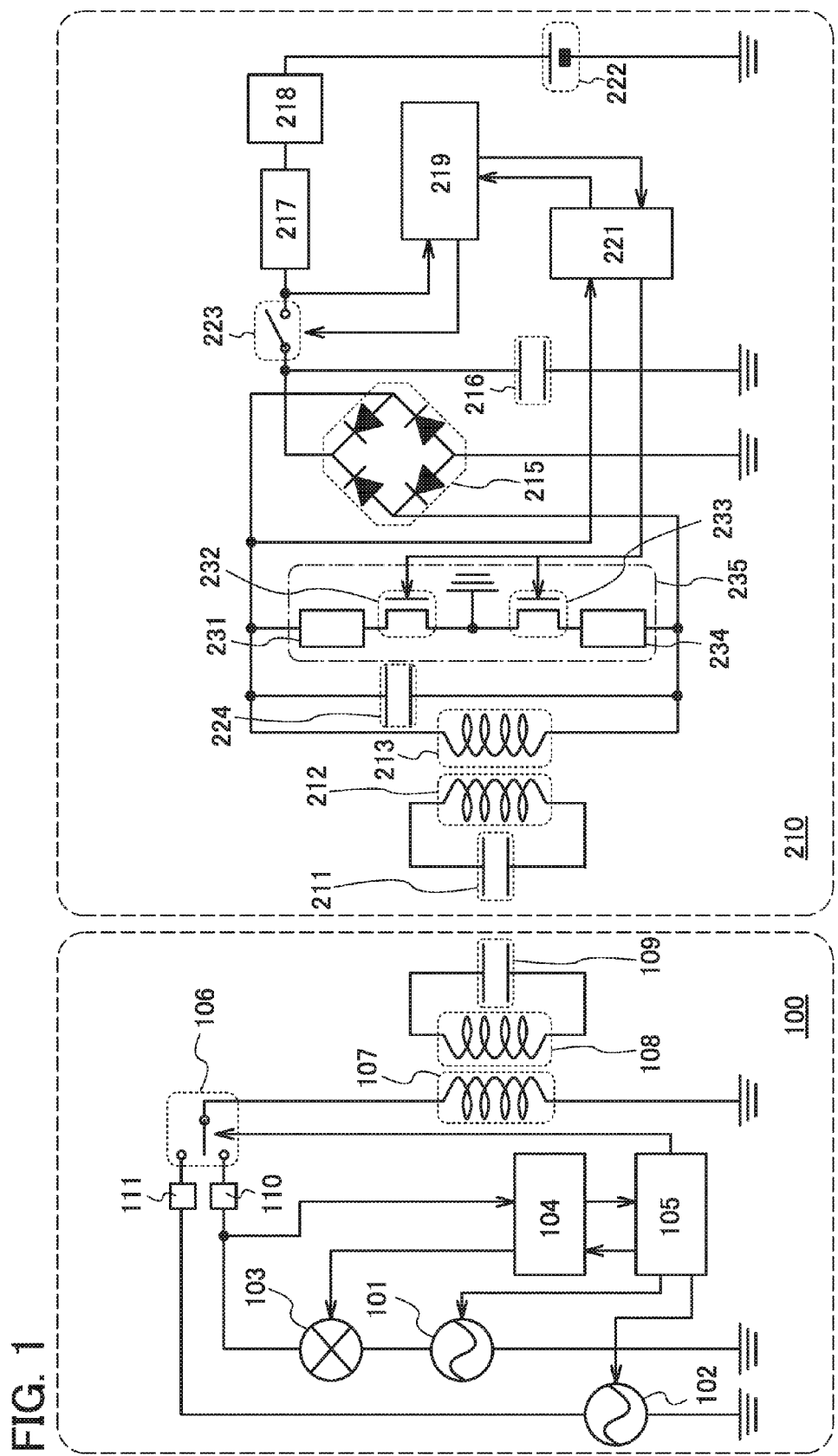
FIG. 1 is a circuit diagram of a contactless power feeding system.

Embodiments of the invention disclosed in this specification will be hereinafter described with reference to the accompanying drawings. Note that the invention disclosed in this specification can be carried out in a variety of different modes, and it is easily understood by those skilled in the art that the modes and details of the invention disclosed in this specification can be changed in various ways without departing from the spirit and scope thereof. Therefore, the present invention is not construed as being limited to description of the embodiments. Note that, in the drawings hereinafter shown, the same portions or portions having similar functions are denoted by the same reference numerals, and repeated description thereof will be omitted.

Note that in the invention disclosed in this specification, a semiconductor device refers to an element or a device which functions by utilizing a semiconductor and includes, in its category, an electric device including an electronic circuit, a display device, a light-emitting device, and the like and an electronic appliance on which the electric device is mounted.

Note that the position, size, range, or the like of each structure shown in the drawings and the like is not accurately represented in some cases for easy understanding. Therefore, the invention disclosed herein is not necessarily limited to the position, size, range, or the like as disclosed in the drawings and the like.

In this specification and the like, ordinal numbers such as "first", "second", and "third" are used in order to avoid confusion among components, and the terms do not mean limitation of the number of components.

[Embodiment 1]

FIG. 1 is a circuit diagram of a contactless power feeding system including a wireless communication function of this embodiment. The contactless power feeding system illustrated in FIG. 1 includes a power transmitting device 100 and a power receiving device 210.

The contactless power feeding system illustrated in FIG. 1 is the application of a wireless communication system using the RFID technology to a contactless power feeding system. In the contactless power feeding system illustrated in FIG. 1, an electromagnetic wave generated in the power transmitting device 100 is amplitude-modulated and with the use of the amplitude-modulated electromagnetic wave (modulation signal) wireless communication is performed between the power transmitting device 100 and the power receiving device 210.

The power transmitting device 100 includes a first AC power source 101 configured to generate an AC power with a first frequency, a second AC power source 102 configured to generate an AC power with a second frequency, a mixer 103, a transmission/reception circuit 104, a control circuit 105, a switch 106, an electromagnetic induction coil 107, a resonant coil 108, a capacitor 109, a matching circuit 110, and a matching circuit 111. The switch 106 switches the connection to the electromagnetic induction coil 107 so that the electromagnetic induction coil 107 is connected to the AC power source 101 or the AC power source 102 based on a signal from the control circuit 105. As the control circuit 105, a microprocessor is used, for example.

The power receiving device 210 includes a capacitor 211, a resonant coil 212, an electromagnetic induction coil 213, a capacitor 224, a load 231, a transistor 232, a transistor 233, a load 234, a rectifier circuit 215, a smoothing circuit 216, a voltage conversion circuit 217, a charge control circuit 218, a control circuit 219, a transmission/reception circuit 221, a power storage unit 222, and a switch 223. Note that a load modulation circuit 235 includes the load 231, the transistor 232, the transistor 233, and the load 234. As the voltage conversion circuit 217, a DC-DC converter is used, for example. As the control circuit 219, a microprocessor is used, for example. As the smoothing circuit 216, a capacitor is used, for example.

The AC power source 101 is a power source which generates an AC power with the first frequency. The AC power source 101 is an AC power source for communication and generates an AC power of 13.56 MHz, for example. A first terminal of the AC power source 101 is electrically connected to a first terminal of the mixer 103. A second terminal of the AC power source 101 is electrically connected to a first terminal of the control circuit 105. A third terminal of the AC power source 101 is grounded.

The AC power source 102 is a power source which generates an AC power with the second frequency. The AC power source 102 is an AC power source for power feeding and generates an AC power of 100 kHz, for example. A first terminal of the AC power source 102 is electrically connected to a first terminal of the matching circuit 111. A second terminal of the AC power source 102 is electrically connected to a second terminal of the control circuit 105. A third terminal of the AC power source 102 is grounded.

The mixer 103 has a function of generating a modulation signal by superimposing an AC power from the AC power source 101 on a signal from the transmission/reception circuit 104. The first terminal of the mixer 103 is electrically connected to the first terminal of the AC power source 101. A second terminal of the mixer 103 is electrically connected to a second terminal of the transmission/reception circuit 104 and a first terminal of the matching circuit 110. A third terminal of the mixer 103 is electrically connected to a first terminal of the transmission/reception circuit 104.

The transmission/reception circuit 104 has functions of converting a signal output from the control circuit 105 into a signal which can be processed by the mixer 103 and converting a modulation signal received by the power transmitting device 100 into a signal which can be processed by the control circuit 105.

The first terminal of the transmission/reception circuit 104 is electrically connected to the third terminal of the mixer 103. The second terminal of the transmission/reception circuit 104 is electrically connected to the second terminal of the mixer 103 and the first terminal of the matching circuit 110. A third terminal of the transmission/reception circuit 104 is electrically connected to a third terminal of the control circuit 105. A fourth terminal of the transmission/reception circuit 104 is electrically connected to a fourth terminal of the control circuit 105. Note that a directional coupler (also referred to as coupler) may be provided among the second terminal of the mixer 103, the first terminal of the matching circuit 110, and the second terminal of the transmission/reception circuit 104.

The directional coupler can take out signals corresponding to electric power transferred in a forward direction (traveling wave), or electric power transferred in the reverse direction (reflected wave), or the both thereof.

The control circuit 105 has functions of generating a transmission signal to be transmitted to the power receiving device 210 and processing a response signal which is returned from the power receiving device 210 in response to the transmission signal and which contains data of the power receiving device 210. The first terminal of the control circuit 105 is electrically connected to the second terminal of the AC power source 101. The second terminal of the control circuit 105 is electrically connected to the second terminal of the AC power source 102. The third terminal of the control circuit 105 is electrically connected to the third terminal of the transmission/reception circuit 104. The fourth terminal of the control circuit 105 is electrically connected to the fourth terminal of the transmission/reception circuit 104.

The matching circuit 110 has a function of suppressing impedance mismatching in order that wireless communication is performed efficiently in the case where wireless communication is performed by the electromagnetically induced resonance between the electromagnetic induction coil 107 and the electromagnetic induction coil 213. The first terminal of the matching circuit 110 is electrically connected to the second terminal of the transmission/reception circuit 104 and the second terminal of the mixer 103. A second terminal of the matching circuit 110 is electrically connected to a first terminal of the switch 106.

The matching circuit 111 has a function of suppressing impedance mismatching in order that wireless power feeding is performed efficiently in the case where wireless power feeding is performed by a magnetic resonance between the resonant coil 108 and the resonant coil 212. The first terminal of the matching circuit 111 is electrically connected to the first terminal of the AC power source 102. A second terminal of the matching circuit 111 is electrically connected to a second terminal of the switch 106.

The switch 106, as described above, has a function of switching the connection to the electromagnetic induction coil 107 so that the electromagnetic induction coil 107 is connected to the AC power source 101 or the AC power source 102 based on a signal from the control circuit 105. The first terminal of the switch 106 is electrically connected to the second terminal of the matching circuit 110. The second terminal of the switch 106 is electrically connected to the second terminal of the matching circuit 111. A third terminal of the switch 106 is electrically connected to one terminal of the electromagnetic induction coil 107. A fourth terminal of the switch 106 is electrically connected to a fifth terminal of the control circuit 105. Based on a signal from the control circuit 105 which is input to the fourth terminal of the switch 106, the third terminal of the switch 106 is connected to either the first terminal or the second terminal of the switch 106. In the case where the first terminal of the switch 106 is electrically connected to the third terminal of the switch 106, the AC power source 101 is electrically connected to the electromagnetic induction coil 107. On the other hand, in the case where the second terminal of the switch 106 is electrically connected to the third terminal of the switch 106, the AC power source 102 is electrically connected to the electromagnetic induction coil 107.

The one terminal of the electromagnetic induction coil 107 is electrically connected to the third terminal of the switch 106. The other terminal of the electromagnetic induction coil 107 is grounded.

One terminal of the resonant coil 108 is electrically connected to one terminal of the capacitor 109. The other terminal of the resonant coil 108 is electrically connected to the other terminal of the capacitor 109.

Power feeding from the AC power source 102 to the resonant coil 108 is performed via the electromagnetic induction coil 107 by an electromagnetic coupling method.

The electromagnetic induction coil 107 of the power transmitting device 100 and the electromagnetic induction coil 213 of the power receiving device 210 are each, for example, a coil of about one turn, while the resonant coil 108 of the power transmitting device 100 and the resonant coil 212 of the power receiving device 210 are each, for example, a coil of several turns.

The resonant coil 108 of the power transmitting device 100 and the resonant coil 212 of the power receiving device 210 described below may each be open at the opposite ends. In this case, the resonant coil 108 and the resonant coil 212 each have floating capacitance and serve as an LC resonant circuit.

In the resonant coil 108 of the power transmitting device 100 and the resonant coil 212 of the power receiving device 210, the resonance frequencies (LC resonance) are adjusted so that a magnetic resonance phenomenon occurs at a particular frequency.

When the resonant coil 108 of the power transmitting device 100 and the resonant coil 212 of the power receiving device 210 face each other, they makes a magnetic resonance phenomenon, and thereby efficient power transfer is realized even when the distance between the resonant coils is large.

In a power transfer technique using coils, there is a parameter k×Q (k is a coupling coefficient and Q is a Q value of a resonant coil) as a parameter that represents an index of power transfer efficiency. The coupling coefficient k is a coupling coefficient that represents a degree of coupling of the resonant coil on the power feeding side and the resonant coil on the power receiving side. Further, the Q value is a value showing sharpness in a resonance peak of a resonant circuit. As the resonant coil 108 and the resonant coil 212, resonant coils having extremely high Q values (for example, Q is larger than 100 (k×Q is larger than 1)) are preferably used, and thereby a contactless power feeding technique using a magnetic resonance method can provide a high power transfer efficiency.

In the power receiving device 210, one terminal of the resonant coil 212 is electrically connected to one terminal of the capacitor 211. The other terminal of the resonant coil 212 is electrically connected to the other terminal of the capacitor 211.

One terminal of the electromagnetic induction coil 213 is electrically connected to one terminal of the capacitor 224, one terminal of the load 231, a first terminal of the transmission/reception circuit 221, and a first terminal of the rectifier circuit 215. The other terminal of the electromagnetic induction coil 213 is electrically connected to the other terminal of the capacitor 224, one terminal of the load 234, and a second terminal of the rectifier circuit 215.

Although, in FIG. 1, the power transmitting device 100 includes the electromagnetic induction coil 107, the resonant coil 108, and the capacitor 109 (collectively referred to as a power transmitting element) and the power receiving device 210 includes the electromagnetic induction coil 213, the resonant coil 212, and the capacitor 211 (collectively referred to as a power receiving element), the structure is not limited to thereto. The power transmitting element and the power receiving element may each be a magnetic field type element including a helical antenna or an electric field type element including a meander line antenna.

The capacitor 224 is necessary for performing electromagnetic induction between the electromagnetic induction coil 107 and the electromagnetic induction coil 213. The electromagnetically induced resonance occurs between the electromagnetic induction coil 107 and the electromagnetic induction coil 213, whereby wireless communication is performed.

The electromagnetic induction coil 213 and the capacitor 224 form an LC circuit which is one of resonant circuits. A resonance frequency f is expressed by a formula $f=(1/2\pi)(1/(\sqrt{L}\sqrt{C}))$, where the inductance of the coil is the inductance L and the capacitance of the capacitor is the capacitance C. That is to say, the resonance frequency f is a function that depends on the inductance L of the coil and the capacitance C of the capacitor. Therefore, the resonance frequency f can be determined by varying the inductance L of the coil and the capacitance C of the capacitor.

The one terminal of the capacitor 224 is electrically connected to the one terminal of the electromagnetic induction coil 213, the one terminal of the load 231, the first terminal of the transmission/reception circuit 221, and the first terminal of the rectifier circuit 215. The other terminal of the capacitor 224 is electrically connected to the other terminal of the electromagnetic induction coil 213, the one terminal of the load 234, and the second terminal of the rectifier circuit 215.

As described above, the load modulation circuit 235 includes the load 231, the transistor 232, the transistor 233, and the load 234.

The one terminal of the load 231 is electrically connected to the one terminal of the capacitor 224, the one terminal of the electromagnetic induction coil 213, the first terminal of the transmission/reception circuit 221, and the first terminal of the rectifier circuit 215. The other terminal of the load 231 is electrically connected to one of a source and a drain of the transistor 232.

A gate of the transistor 232 is electrically connected to a second terminal of the transmission/reception circuit 221 and a gate of the transistor 233. The one of the source and the drain of the transistor 232 is electrically connected to the other terminal of the load 231. The other of the source and the drain of the transistor 232 is electrically connected to one of a source and a drain of the transistor 233 and is grounded.

The gate of the transistor 233 is electrically connected to the second terminal of the transmission/reception circuit 221 and the gate of the transistor 232. The one of the source and the drain of the transistor 233 is electrically connected to the other of the source and the drain of the transistor 232 and is grounded. The other of the source and the drain of the transistor 233 is electrically connected to the other terminal of the load 234.

The one terminal of the load 234 is electrically connected to the other terminal of the electromagnetic induction coil 213, the other terminal of the capacitor 224, and the second terminal of the rectifier circuit 215. The other terminal of the load 234 is electrically connected to the other of the source and the drain of the transistor 233.

The rectifier circuit 215 is a bridge rectifier including four diodes. The rectifier circuit 215 functions as an AC-DC converter which converts an AC power into a DC power. The first terminal of the rectifier circuit 215 is electrically connected to the one terminal of the electromagnetic induction coil 213, the one terminal of the capacitor 224, the one terminal of the load 231, and the first terminal of the transmission/reception circuit 221. The second terminal of the rectifier circuit 215 is electrically connected to the other terminal of the electromagnetic induction coil 213, the other terminal of the capacitor 224, and the one terminal of the load 234. A third terminal of the rectifier circuit 215 is electrically connected to one terminal of the smoothing circuit 216 and a first terminal of the switch 223. A fourth terminal of the rectifier circuit 215 is grounded.

The smoothing circuit 216 has a function of smoothing a DC power output from the rectifier circuit 215 by storing and releasing the DC power. As the smoothing circuit 216, a capacitor is used in this embodiment. The one terminal of the smoothing circuit 216 is electrically connected to the third terminal of the rectifier circuit 215 and the first terminal of the switch 223. The other terminal of the smoothing circuit 216 is grounded.

The switch 223 has a function of connecting and disconnecting the smoothing circuit 216 and the rectifier circuit 215 to the voltage conversion circuit 217 and a first terminal of the control circuit 219. Switching between the connection and disconnection is performed based on a signal from a second terminal of the control circuit 219. The first terminal of the switch 223 is electrically connected to the third terminal of the rectifier circuit 215 and the one terminal of the smoothing circuit 216. A second terminal of the switch 223 is electrically connected to a first terminal of the voltage conversion circuit 217 and the first terminal of the control circuit 219. A third terminal of the switch 223 is electrically connected to the second terminal of the control circuit 219.

The voltage conversion circuit 217 converts a voltage value of a DC power into another voltage value. The first terminal of the voltage conversion circuit 217 is electrically connected to the first terminal of the control circuit 219 and the second terminal of the switch 223. A second terminal of the voltage conversion circuit 217 is electrically connected to a first terminal of the charge control circuit 218.

The charge control circuit 218 controls charging of the power storage unit 222 with the DC power output from the voltage conversion circuit 217. The first terminal of the charge control circuit 218 is electrically connected to the second terminal of the voltage conversion circuit 217. A second terminal of the charge control circuit 218 is electrically connected to a positive electrode of the power storage unit 222.

The positive electrode of the power storage unit 222 is electrically connected to the second terminal of the charge control circuit 218. A negative electrode of the power storage unit 222 is grounded.

The transmission/reception circuit 221 has functions of converting a signal output from the control circuit 219 into a signal which can be processed by the load modulation circuit 235 and converting a modulation signal received by the power receiving device 210 into a signal which can be processed by the control circuit 219. The first terminal of the transmission/reception circuit 221 is electrically connected to the one terminal of the electromagnetic induction coil 213, the one terminal of the capacitor 224, the one terminal of the load 231, and the first terminal of the rectifier circuit 215. The second terminal of the transmission/reception circuit 221 is electrically connected to the gate of the transistor 232 and the gate of the transistor 233. A third terminal of the transmission/reception circuit 221 is electrically connected to a third terminal of the control circuit 219. A fourth terminal of the transmission/reception circuit 221 is electrically connected to a fourth terminal of the control circuit 219.

The control circuit 219 has functions of processing a signal transmitted from the power transmitting device 100, generating a response signal which contains data of the power receiving device 210, detecting power (voltage and current) input to the voltage conversion circuit 217, and controlling on/off of the switch 223.

The first terminal of the control circuit 219 is electrically connected to the first terminal of the voltage conversion circuit 217 and the second terminal of the switch 223. The second terminal of the control circuit 219 is electrically connected to the third terminal of the switch 223. The third terminal of the control circuit 219 is electrically connected to the third terminal of the transmission/reception circuit 221. The fourth terminal of the control circuit 219 is electrically connected to the fourth terminal of the transmission/reception circuit 221.

In the contactless power feeding system illustrated in FIG. 1, when wireless communication is performed, the switch 106 electrically connects the AC power source 102 to the electromagnetic induction coil 107. In addition, the switch 223 is turned off.

In the contactless power feeding system illustrated in FIG. 1, when wireless power feeding (contactless power feeding) is performed, the switch 106 electrically connects the AC power source 101 to the electromagnetic induction coil 107. In addition, the switch 223 is turned on.

Figure 3:
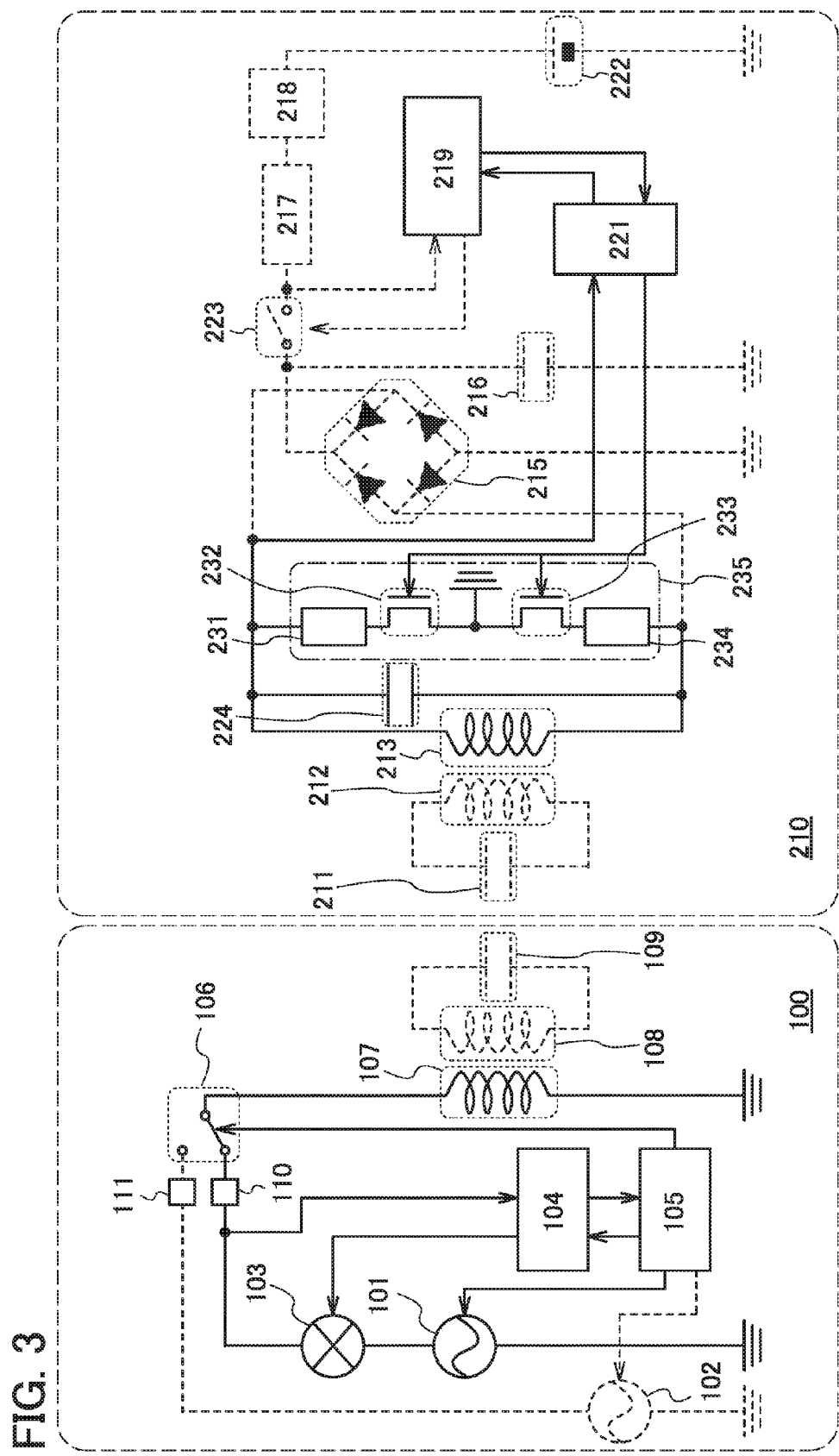
FIG. 3 is a circuit diagram of a contactless power feeding system.
Figure 4:
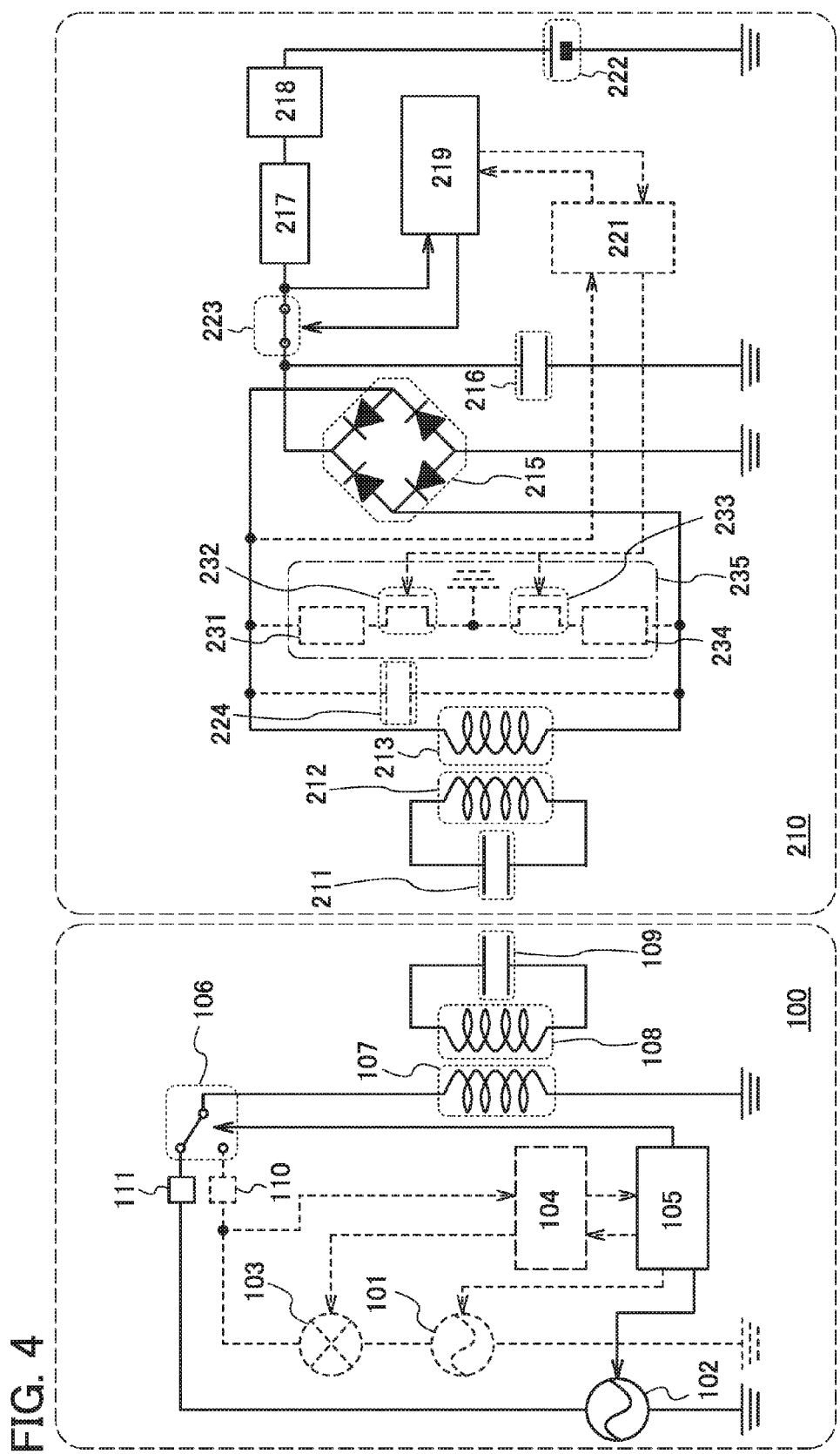
FIG. 4 is a circuit diagram of a contactless power feeding system.
Figure 5:
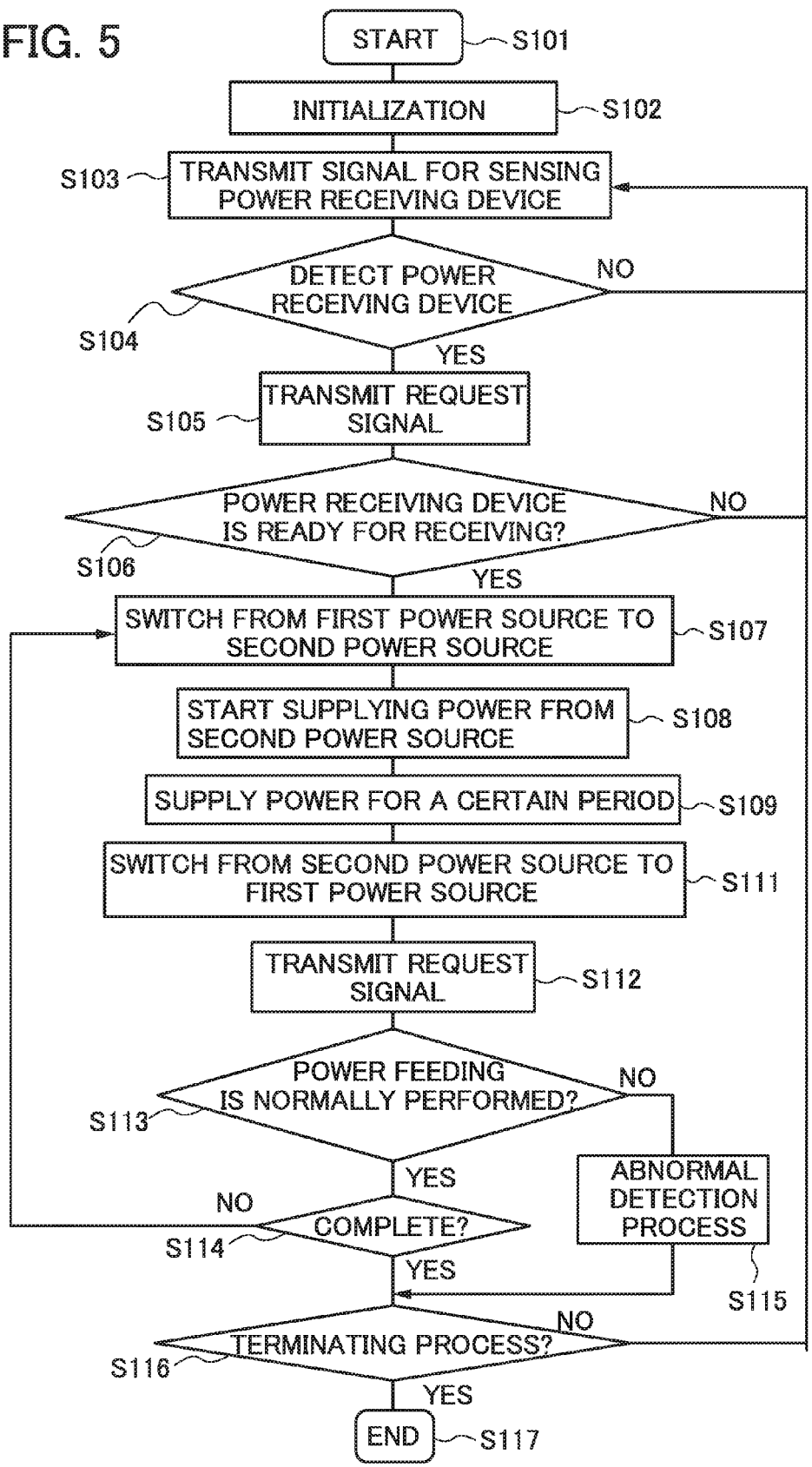
FIG. 5 is a flow chart of an operation of a contactless power feeding system.

FIG. 5 is a flow chart of operation of the contactless power feeding system illustrated in FIG. 1. Among components of the contactless power feeding system illustrated in FIG. 1, components that are not engaged in the operation are shown by a dotted line in FIG. 3 and FIG. 4.

When feeding of power to the contactless power feeding system starts (S101), the AC power source 101 for communication is used for a power source and the AC power source 102 for power feeding is turned off (S102) as an initialization process. That is to say, the first terminal of the switch 106 is electrically connected to the third terminal of the switch 106, whereby the AC power source 101 is electrically connected to the electromagnetic induction coil 107 (see FIG. 3).

Next, a transmission signal (signal for sensing the power receiving device 210) which is generated by the control circuit 105 and on which the AC power from the AC power source 101 is superimposed is transmitted to the power receiving device 210 via the transmission/reception circuit 104, the mixer 103, the matching circuit 110, the switch 106, and the electromagnetic induction coil 107 (S103).

As described above, the electromagnetic induction coil 213 and the capacitor 224 in the power receiving device 210 form an LC circuit which is one of resonant circuits. The inductance L of the electromagnetic induction coil 213 and the capacitance C of the capacitor 224 are set so that a resonance phenomenon occurs at the resonance frequency f (e.g. 13.56 MHz).

Accordingly, wireless communication of Step S103 is performed at a frequency of 13.56 MHz, for example.

At this time, wireless communication between the electromagnetic induction coil 107 and the electromagnetic induction coil 213 is performed using the phenomenon of the electromagnetically induced resonance. Note that the magnetic resonance phenomenon between the resonant coil 108 and the resonant coil 212 is not influenced by the frequency in which the phenomenon of the electromagnetically induced resonance occurs between the electromagnetic induction coil 107 and the electromagnetic induction coil 213.

The transmission signal (signal for sensing the power receiving device 210) from the power transmitting device 100 is transmitted to the control circuit 219 via the electromagnetic induction coil 213 and the transmission/reception circuit 221 in the power receiving device 210.

A response signal in response to the transmission signal is input from the control circuit 219 to the load modulation circuit 235 via the second terminal of the transmission/reception circuit 221. Accordingly, the load modulation circuit 235 generates a modulation signal based on the response signal. The electromagnetic induction coil 213 and the electromagnetic induction coil 107 resonate by electromagnetic induction, whereby the modulation signal is transmitted to the power transmitting device 100. The modulation signal is transmitted to the control circuit 105 via the electromagnetic induction coil 107 and the transmission/reception circuit 104. In such a manner, whether the power receiving device 210 exists is detected.

In the case where the existence of the power receiving device 210 is detected with the transmission signal (signal for sensing the power receiving device 210) from the power transmitting device 100 (S104), a transmission signal (signal for requesting the status of the power receiving device 210) is transmitted from the power transmitting device 100 (S105). In the case where the existence of the power receiving device 210 is not detected (S104), the transmission signal (signal for sensing the power receiving device 210) is transmitted again from the power transmitting device 100 to the power receiving device 210 (S103).

With the transmission signal (signal for requesting the status of the power receiving device 210) from the power transmitting device 100, the control circuit 105 in the power transmitting device 100 determines whether the power receiving device 210 can be supplied with power or not (S106). In the case where the power receiving device 210 can be supplied with power, based on a signal from the control circuit 105, the second terminal of the switch 106 is electrically connected to the third terminal of the switch 106, whereby the AC power source 102 is electrically connected to the electromagnetic induction coil 107. In addition, based on a signal from the control circuit 219, the switch 223 is turned on (see FIG. 4). In such a manner, the power source is switched from the AC power source 101 for communication to the AC power source 102 for power feeding (S107).

An AC power generated by the AC power source 102 for power feeding is transmitted to the resonant coil 108 via the switch 106 and the electromagnetic induction coil 107 and then transmitted from the resonant coil 108 to the resonant coil 212 in the power receiving device 210 by the magnetic resonance phenomenon. In such a manner, the AC power from the AC power source 102 is supplied (S108).

The resonant coil 108 and the capacitor 109 in the power transmitting device 100 form an LC circuit which is one of resonant circuits. The resonant coil 212 and the capacitor 211 in the power receiving device 210 also form an LC circuit. The inductance L of the resonant coil 108 and the capacitance C of the capacitor 109, and the inductance L of the resonant coil 212 and the capacitance C of the capacitor 211 are set to have the same resonance frequency f, so that a resonance phenomenon (magnetic resonance phenomenon) occurs. The magnetic resonance phenomenon realizes wireless power feeding from power transmitting device 100 to the power receiving device 210. Wireless power feeding of Step S108 is performed at the resonance frequency f of 100 kHz, for example.

In the above-described manner, the AC power transmitted to the power receiving device 210 is transmitted to the rectifier circuit 215 via the resonant coil 212 and the electromagnetic induction coil 213. The AC power is rectified and converted into the DC power by the rectifier circuit 215. Further, the DC power is smoothed by the smoothing circuit 216. The smoothed DC power is input to the voltage conversion circuit 217 via the switch 223. The voltage value of the smoothed DC power is converted by the voltage conversion circuit 217. The DC power whose voltage value has been converted is stored in the power storage unit 222 which is controlled by the charge control circuit 218.

After power is supplied to the power storage unit 222 for a certain period (S109), the power source is switched from the AC power source 102 for power feeding to the AC power source 101 for communication (S111). More specifically, based on a signal from the control circuit 105 in the power transmitting device 100, the first terminal of the switch 106 is electrically connected to the third terminal of the switch 106. In such a manner, the AC power source 102 is electrically connected to the electromagnetic induction coil 107. Further, based on a signal from the control circuit 219, the switch 223 is turned off (see FIG. 3).

Next, a transmission signal (signal for requesting the status of the power receiving device 210) is transmitted from the power transmitting device 100 (S112). In the case where the power receiving device 210 is normally supplied with power (S113), power feeding is completed (S114). In the case where power feeding to the power receiving device 210 is completed (S114), a terminating process is performed (S116) and power feeding ends (S117).

In the case where power feeding is not completed (S114), the power source is switched from the AC power source 101 for communication to the AC power source 102 for power feeding (S107) and power is supplied from the AC power source 102 again (S108).

In addition, in the case where power is not normally supplied to the power receiving device 210 (S113), an abnormal detection process is performed (S115), a terminating process is performed (S116), and then power feeding ends (S117).

In the above-described manner, in the contactless power feeding system of this embodiment, wireless communication is performed using the AC power source 101 and wireless power feeding (contactless power feeding) is performed using the AC power source 102.

According to this embodiment as described above, in the contactless power feeding system capable of both wireless communication and contactless power feeding, it is not necessary to manufacture a system for wireless communication and a system for contactless power feeding separately. Therefore, with this embodiment, the contactless power feeding system which is small in size and can be manufactured at low cost can be obtained.

[Embodiment 2]

In this embodiment, a contactless power feeding system that has a different structure from that in Embodiment 1 is described.

Figure 6:
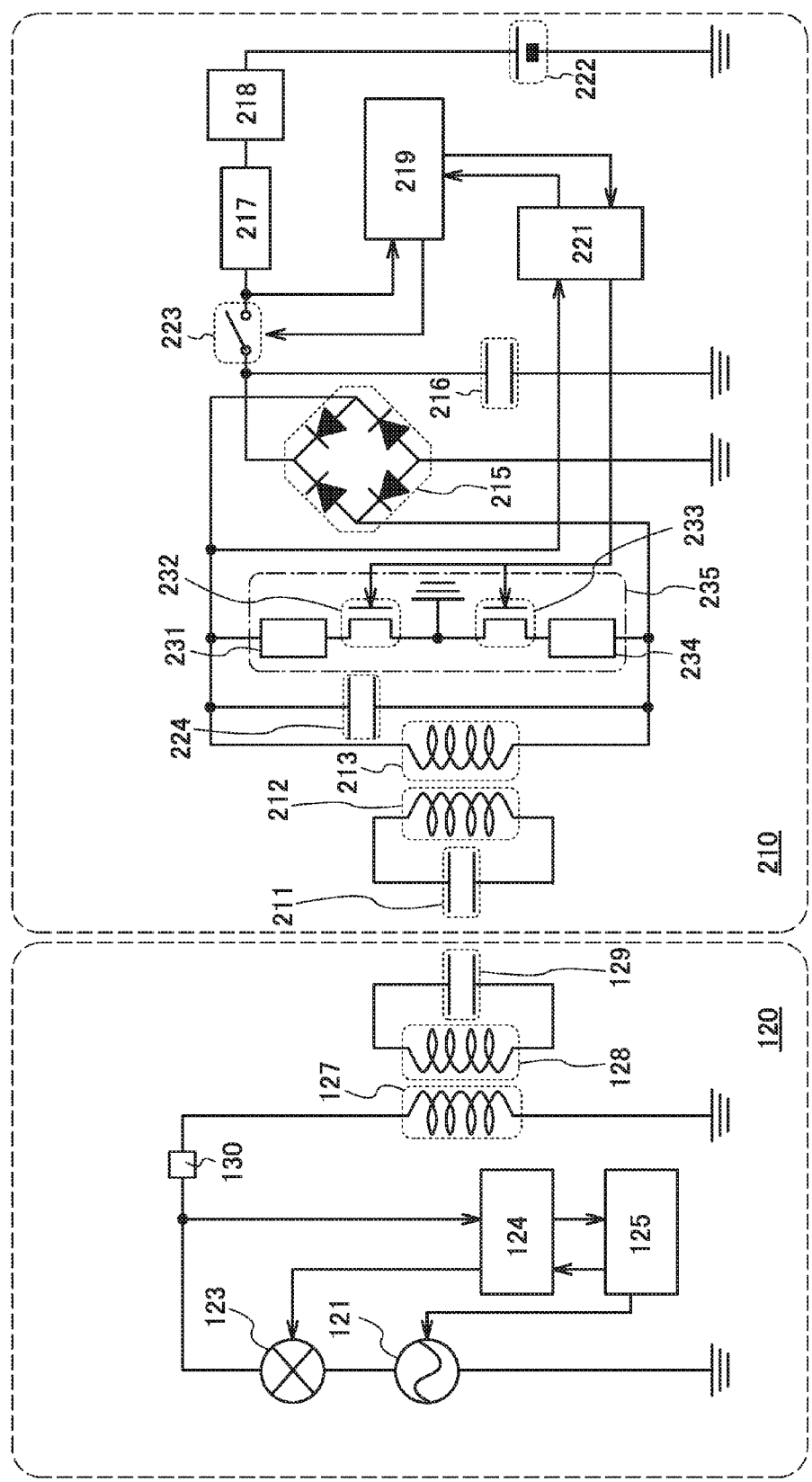
FIG. 6 is a circuit diagram of a contactless power feeding system.

FIG. 6 illustrates a circuit diagram of a contactless power feeding system that is different from that in FIG. 1. The contactless power feeding system illustrated in FIG. 6 includes a power transmitting device 120 and a power receiving device 210. Note that the power receiving device 210 illustrated in FIG. 6 is the same as the power receiving device 210 illustrated in FIG. 1; therefore, the description is not repeated.

The power transmitting device 120 illustrated in FIG. 6 includes an AC power source 121, a mixer 123, a transmission/reception circuit 124, a control circuit 125, a matching circuit 130, an electromagnetic induction coil 127, a resonant coil 128, and a capacitor 129.

The AC power source 121 is a frequency-variable AC power source. The detailed circuit configurations of the AC power source 121 is illustrated in FIG. 2A and FIG. 2B.

Figure 2A:
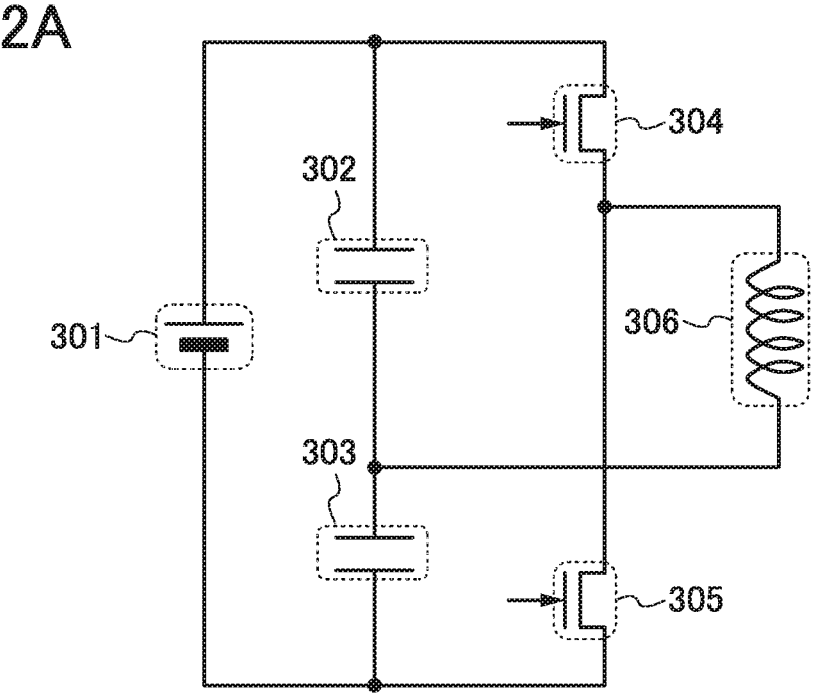
FIG. 2A and FIG. 2B are circuit diagrams of AC power sources.

In the half-bridge type switching power source illustrated in FIG. 2A, the alternating current is supplied to a coil 306 using the transistor 304 and the transistor 305 as switching elements based on signals input to the gates of the transistor 304 and the transistor 305 from the external. In this manner, an AC power is generated.

In the case where the half-bridge type switching power source illustrated in FIG. 2A is used as the AC power source 121, by varying the frequency of the signals input to the gates of the transistor 304 and the transistor 305, an AC power with a frequency for wireless communication (also referred to as first frequency) and an AC power with a frequency for wireless power feeding (also referred to as second frequency) can be obtained.

Figure 2B:
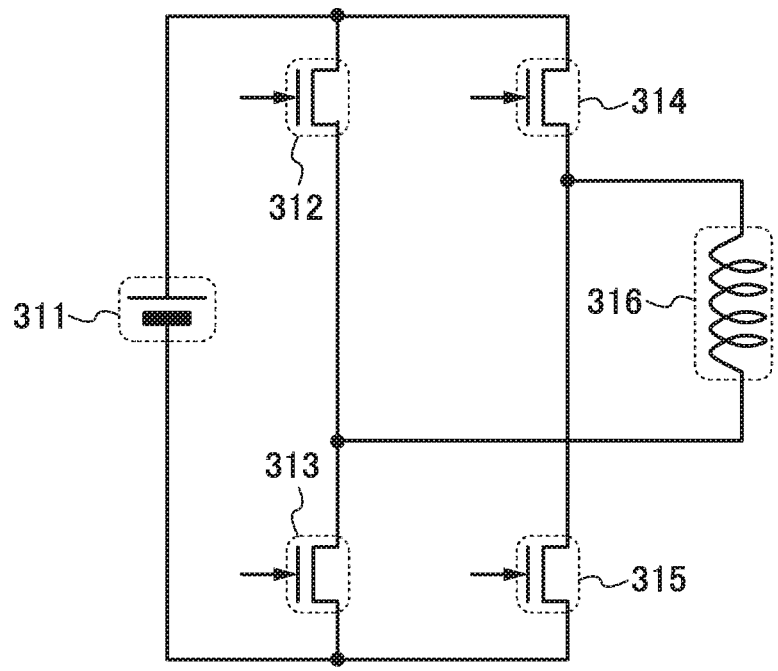

In the full-bridge type switching power source illustrated in FIG. 2B, the alternating current is supplied to the coil 316 using the transistor 312, the transistor 313, the transistor 314, and the transistor 315 as switching elements based on the signals input to the gates of the transistor 312 and the transistor 315 and signals input to the gates of the transistor 313 and the transistor 314 from the external. In this manner, an AC power is generated.

In the case where the full-bridge type switching power source illustrated in FIG. 2B is used as the AC power source 121, by varying the frequency of the signals input to the gates of the transistor 312 and the transistor 315 and the signals input to the gates of the transistor 313 and the transistor 314, an AC power with a frequency for wireless communication (also referred to as first frequency) and an AC power with a frequency for wireless power feeding (also referred to as second frequency) can be obtained.

As described above, in the contactless power feeding system of this embodiment, by providing only one AC power source, instead of two, and varying the frequency of the one AC power source, both wireless communication and wireless power feeding are performed.

A first terminal of the AC power source 121 is electrically connected to a first terminal of the mixer 123. A second terminal of the AC power source 121 is electrically connected to a first terminal of the control circuit 125. A third terminal of the AC power source 121 is grounded.

The mixer 123 is the same element as the mixer 103 and has a function of generating a modulation signal by superimposing an AC power from the AC power source 121 on a signal from the transmission/reception circuit 124. The first terminal of the mixer 123 is electrically connected to the first terminal of the AC power source 121. A second terminal of the mixer 123 is electrically connected to a second terminal of the transmission/reception circuit 124 and a first terminal of the matching circuit 130. A third terminal of the mixer 123 is electrically connected to a first terminal of the transmission/reception circuit 124.

The transmission/reception circuit 124 is the same element as the transmission/reception circuit 104 and has functions of converting a signal output from the control circuit 125 into a signal which can be processed by the mixer 123 and converting a modulation signal received by the power transmitting device 120 into a signal which can be processed by the control circuit 125.

The first terminal of the transmission/reception circuit 124 is electrically connected to the third terminal of the mixer 123. The second terminal of the transmission/reception circuit 124 is electrically connected to the second terminal of the mixer 123 and the first terminal of the matching circuit 130. A third terminal of the transmission/reception circuit 124 is electrically connected to a second terminal of the control circuit 125. A fourth terminal of the transmission/reception circuit 124 is electrically connected to a third terminal of the control circuit 125.

The control circuit 125 is the same element as the control circuit 105 and has functions of generating a transmission signal to be transmitted to the power receiving device 210 and processing a response signal which is returned from the power receiving device 210 in response to the transmission signal and which contains data of the power receiving device 210.

The first terminal of the control circuit 125 is electrically connected to the second terminal of the AC power source 121. The second terminal of the control circuit 125 is electrically connected to the third terminal of the transmission/reception circuit 124. The third terminal of the control circuit 125 is electrically connected to the fourth terminal of the transmission/reception circuit 124.

The matching circuit 130 has a function of suppressing impedance mismatching in order that wireless communication and wireless power feeding are performed efficiently in the cases where wireless communication is performed by the electromagnetically induced resonance between the electromagnetic induction coil 127 and the electromagnetic induction coil 213, and where wireless power feeding is performed by the magnetic resonance between the resonant coil 128 and the resonant coil 212. The first terminal of the matching circuit 130 is electrically connected to the second terminal of the transmission/reception circuit 124 and the second terminal of the mixer 123. A second terminal of the matching circuit 130 is electrically connected to one terminal of the electromagnetic induction coil 127.

The one terminal of the electromagnetic induction coil 127 is electrically connected to the second terminal of the matching circuit 130. The other terminal of the electromagnetic induction coil 127 is grounded.

One terminal of the resonant coil 128 is electrically connected to one terminal of the capacitor 129. The other terminal of the resonant coil 128 is electrically connected to the other terminal of the capacitor 129.

Figure 7:
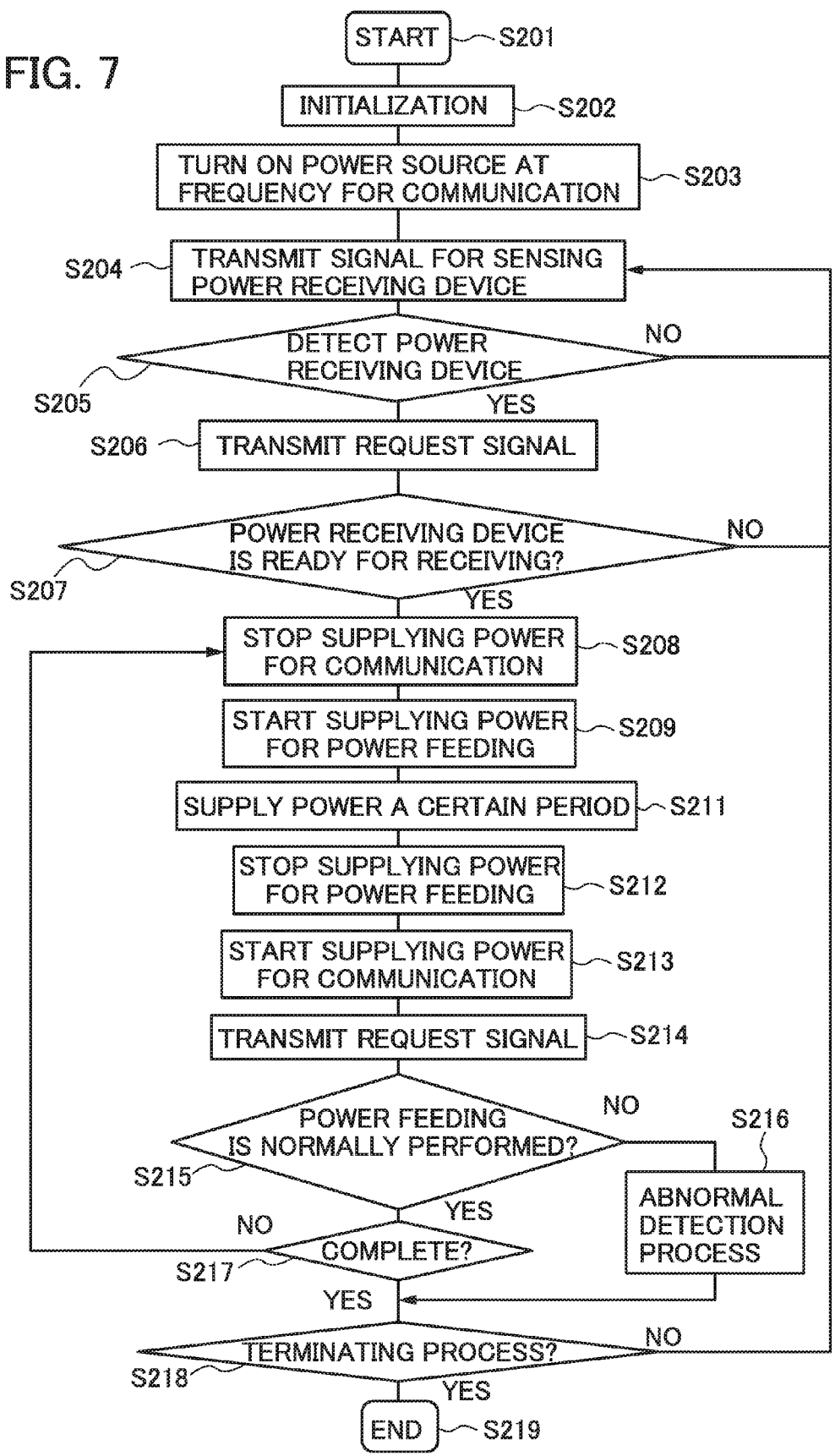
FIG. 7 is a flow chart of an operation of a contactless power feeding system.

FIG. 7 is a flow chart of operation of the contactless power feeding system illustrated in FIG. 6.

When feeding of power to the contactless power feeding system starts (S201), the AC power source 121 is turned off as an initialization process (S202).

Next, the AC power source 121 is turned on at a frequency for communication (S203). That is to say, the transistor contained in the power source illustrated in FIG. 2A or FIG. 2B is driven at a frequency for communication (first frequency). The frequency at this time is 13.56 MHz, for example.

Next, a transmission signal (signal for sensing the power receiving device 210) which is generated in the control circuit 125 and on which the AC power from the AC power source 121 is superimposed is transmitted to the power receiving device 210 via the transmission/reception circuit 124, the mixer 123, the matching circuit 130, and the electromagnetic induction coil 127 (S205).

At this time, wireless communication between the electromagnetic induction coil 127 and the electromagnetic induction coil 213 is performed using the phenomenon of the electromagnetically induced resonance. Note that the magnetic resonance phenomenon between the resonant coil 128 and the resonant coil 212 is not influenced by the frequency of the electromagnetically induced resonance between the electromagnetic induction coil 127 and the electromagnetic induction coil 213.

The transmission signal (signal for sensing the power receiving device 210) from the power transmitting device 120 is transmitted to the control circuit 219 via the electromagnetic induction coil 213 and the transmission/reception circuit 221 in the power receiving device 210.

A response signal in response to the transmission signal is input from the control circuit 219 to the load modulation circuit 235 via the second terminal of the transmission/reception circuit 221. Accordingly, the load modulation circuit 235 generates a modulation signal based on the response signal. The electromagnetic induction coil 213 and the electromagnetic induction coil 127 resonate by electromagnetic induction, whereby the modulation signal is transmitted to the power transmitting device 120. The modulation signal is transmitted to the control circuit 125 via the electromagnetic induction coil 127 and the transmission/reception circuit 124. In such a manner, whether the power receiving device 210 exists is detected.

In the case where the existence of the power receiving device 210 is detected with the transmission signal (signal for sensing the power receiving device 210) from the power transmitting device 120 (S205), a transmission signal (signal for requesting the status of the power receiving device 210) is transmitted from the power transmitting device 100 (S206). In the case where the existence of the power receiving device 210 is not detected (S205), the transmission signal (signal for sensing the power receiving device 210) is transmitted again from the power transmitting device 120 to the power receiving device 210 (S204).

With the transmission signal (signal for requesting the status of the power receiving device 210) from the power transmitting device 120, the control circuit 125 in the power transmitting device 120 determines whether the power receiving device 210 can be supplied with power or not (S207). In the case where the power receiving device 210 can be supplied with power, the AC power source 121 stops supplying power with the frequency for communication (S208) and starts supplying power with the frequency for power feeding (S209). That is to say, the signals input to the gates of the transistors contained in the power source illustrated in FIG. 2A or FIG. 2B are switched from the signal with the frequency for wireless communication (also referred to as first frequency) to the signal with the frequency for wireless power feeding (also referred to as second frequency). The frequency of the wireless power feeding is 100 kHz, for example.

Moreover, at this time, the switch 223 is turned on based on a signal from the control circuit 219.

In the above-described manner, the AC power transmitted to the power receiving device 210 is transmitted to the rectifier circuit 215 via the resonant coil 212 and the electromagnetic induction coil 213. The AC power is rectified and converted into the DC power by the rectifier circuit 215. Further, the DC power is smoothed by the smoothing circuit 216. The smoothed DC power is input to the voltage conversion circuit 217 via the switch 223. The voltage value of the smoothed DC power is converted by the voltage conversion circuit 217. The DC power whose voltage value has been converted is stored in the power storage unit 222 which is controlled by the charge control circuit 218.

After power is supplied to the power storage unit 222 for a certain period (S211), the AC power source 121 stops supplying power with the frequency for power feeding (S212) and starts supplying power with the frequency for communication (S213). That is to say, the signals input to the gates of the transistors contained in the power source illustrated in FIG. 2A or FIG. 2B are switched from the signal with the frequency for wireless power feeding to the signal with the frequency for wireless communication. The frequency of the wireless power feeding is 13.56 MHz, for example. Moreover, at this time, based on a signal from the control circuit 219, the switch 223 is turned off.

Next, a transmission signal (signal for requesting the status of the power receiving device 210) is transmitted from the power transmitting device 120 (S214). In the case where the power receiving device 210 is normally supplied with power (S215), power feeding is completed (S217). In the case where power feeding to the power receiving device 210 is completed (S217), a terminating process is performed (S218) and power feeding ends (S219).

In the case where power feeding is not completed (S217), the AC power source 121 stops supplying power with the frequency for communication (S208), and then starts supplying power with the frequency for power feeding (S209) and starts supplying power again.

In addition, in the case where power is not normally supplied to the power receiving device 210 (S215), an abnormal detection process is performed (S216), a terminating process is performed (S218), and then power feeding ends (S219).

According to this embodiment as described above, in the contactless power feeding system capable of both wireless communication and contactless power feeding, it is not necessary to manufacture a system for wireless communication and a system for contactless power feeding separately. Therefore, with this embodiment, the contactless power feeding system which is small in size and can be manufactured at low cost can be obtained.

This application is based on Japanese Patent Application serial no. 2011-267725 filed with Japan Patent Office on Dec. 7, 2011, the entire contents of which are hereby incorporated by reference.

What is claimed is:

1. A power receiving device comprising:
a first antenna configured to form resonant coupling and receive first power through the resonant coupling;
a second antenna configured to form electromagnetic induction coupling with the first antenna and receive second power from the first antenna through the electromagnetic induction coupling with the first antenna;
a rectifier circuit configured to convert the second power received by the second antenna into a DC power;
a smoothing circuit configured to smooth the DC power converted by the rectifier circuit;
a voltage conversion circuit configured to convert a voltage value of the DC power smoothed by the smoothing circuit into a different voltage value;
a charge control circuit to which an output power from the voltage conversion circuit is input; and
a power storage device,
wherein charging the power storage device is controlled by the charge control circuit.

2. The power receiving device according to claim 1,
wherein the first antenna comprises a first resonant coil and a first capacitor,
wherein one terminal of the first resonant coil is electrically connected to a first terminal of the first capacitor, and
wherein the other terminal of the first resonant coil is electrically connected to a second terminal of the first capacitor.

3. The power receiving device according to claim 1,
wherein the second antenna comprises an electromagnetic induction coil and a second capacitor,
wherein one terminal of the electromagnetic induction coil is electrically connected to a first terminal of the second capacitor, and
wherein the other terminal of the electromagnetic induction coil is electrically connected to a second terminal of the second capacitor.

4. The power receiving device according to claim 3, further comprising:
a control circuit configured to generate a signal; and
a load modulation circuit electrically connected to the electromagnetic induction coil, the load modulation circuit being configured to generate a modulation signal based on the signal.

5. The power receiving device according to claim 1, further comprising a switch between the smoothing circuit and the voltage conversion circuit.

6. A power receiving device comprising:
a first antenna configured to form resonant coupling and receive first power through the resonant coupling;
a second antenna configured to form electromagnetic induction coupling with the first antenna and receive second power from the first antenna through the electromagnetic induction coupling with the first antenna;
a rectifier circuit configured to convert the second power received by the second antenna into a DC power;
a smoothing circuit configured to smooth the DC power converted by the rectifier circuit;
a voltage conversion circuit configured to convert a voltage value of the DC power smoothed by the smoothing circuit into a different voltage value;
a charge control circuit to which an output power from the voltage conversion circuit is input; and
a power storage device,
wherein charging the power storage device is controlled by the charge control circuit, and
wherein the second antenna is configured to form electromagnetic induction coupling with an antenna of a first device to communicate with the first device wirelessly.

7. The power receiving device according to claim 6,
wherein the first device is a power transmitting device, and
wherein the first antenna is configured to receive the first power from the power transmitting device through the resonant coupling.

8. The power receiving device according to claim 6,
wherein the first antenna comprises a first resonant coil and a first capacitor,
wherein one terminal of the first resonant coil is electrically connected to a first terminal of the first capacitor, and
wherein the other terminal of the first resonant coil is electrically connected to a second terminal of the first capacitor.

9. The power receiving device according to claim 6,
wherein the second antenna comprises an electromagnetic induction coil and a second capacitor,
wherein one terminal of the electromagnetic induction coil is electrically connected to a first terminal of the second capacitor, and
wherein the other terminal of the electromagnetic induction coil is electrically connected to a second terminal of the second capacitor.

10. The power receiving device according to claim 9, further comprising:
a control circuit configured to generate a signal; and
a load modulation circuit electrically connected to the electromagnetic induction coil, the load modulation circuit being configured to generate a modulation signal based on the signal.

11. The power receiving device according to claim 6, further comprising a switch between the smoothing circuit and the voltage conversion circuit.

* * * * *